(12) United States Patent
Hallowell

(10) Patent No.: US 11,408,171 B1
(45) Date of Patent: Aug. 9, 2022

(54) MOUNTING BRACKET ASSEMBLY FOR ATTACHMENT TO A SUSPENDED CEILING

(71) Applicant: Leonard J. Hallowell, Omaha, NE (US)

(72) Inventor: Leonard J. Hallowell, Omaha, NE (US)

(73) Assignee: Omaha Custom Manufacturing, Omaha, NE (US)

( * ) Notice: Subject to any disclaimer, the term of this patent is extended or adjusted under 35 U.S.C. 154(b) by 0 days.

(21) Appl. No.: 17/135,050

(22) Filed: Dec. 28, 2020

(51) Int. Cl.
| F16M 13/02 | (2006.01) |
| E04B 9/00 | (2006.01) |
| E04B 9/06 | (2006.01) |

(52) U.S. Cl.
CPC ........... *E04B 9/006* (2013.01); *F16M 13/027* (2013.01); *E04B 9/067* (2013.01)

(58) Field of Classification Search
CPC ........ F16M 13/027; E04B 9/006; E04B 9/067
See application file for complete search history.

(56) References Cited

U.S. PATENT DOCUMENTS

| 4,073,458 A | * | 2/1978 | Sease | A47F 5/0892 |
| | | | | 248/340 |
| 7,264,211 B2 | * | 9/2007 | Lindner | E04B 9/006 |
| | | | | 248/220.21 |
| 7,784,755 B1 | * | 8/2010 | Johnson | E04B 9/006 |
| | | | | 248/220.21 |
| 9,255,402 B2 | * | 2/2016 | Sareyka | E04B 9/20 |
| 10,161,565 B2 | * | 12/2018 | Wu | F16F 1/12 |
| 10,514,127 B2 | * | 12/2019 | Wu | E04B 9/068 |
| 10,533,703 B1 | | 1/2020 | Nguyen | |
| 10,774,985 B1 | * | 9/2020 | Ortel | F16M 13/027 |
| 2014/0117186 A1 | * | 5/2014 | Govindasamy | F16M 13/027 |
| | | | | 248/317 |

* cited by examiner

*Primary Examiner* — Bradley Duckworth
(74) *Attorney, Agent, or Firm* — Suiter Swantz pc llo

(57) ABSTRACT

A mounting bracket assembly for attachment to a horizontally disposed rail of a suspended ceiling system is provided which includes identical first and second mounting bracket members. The mounting bracket assembly of this invention is designed to be attached to the flanges of the rail and attached to one another so as to be able to support an article or object therefrom and the suspended ceiling system.

4 Claims, 11 Drawing Sheets

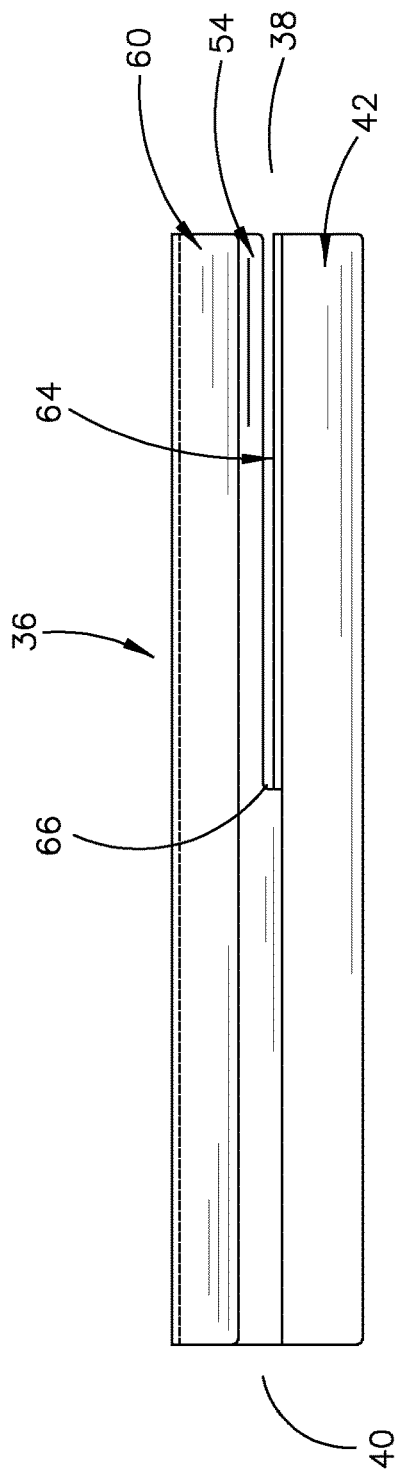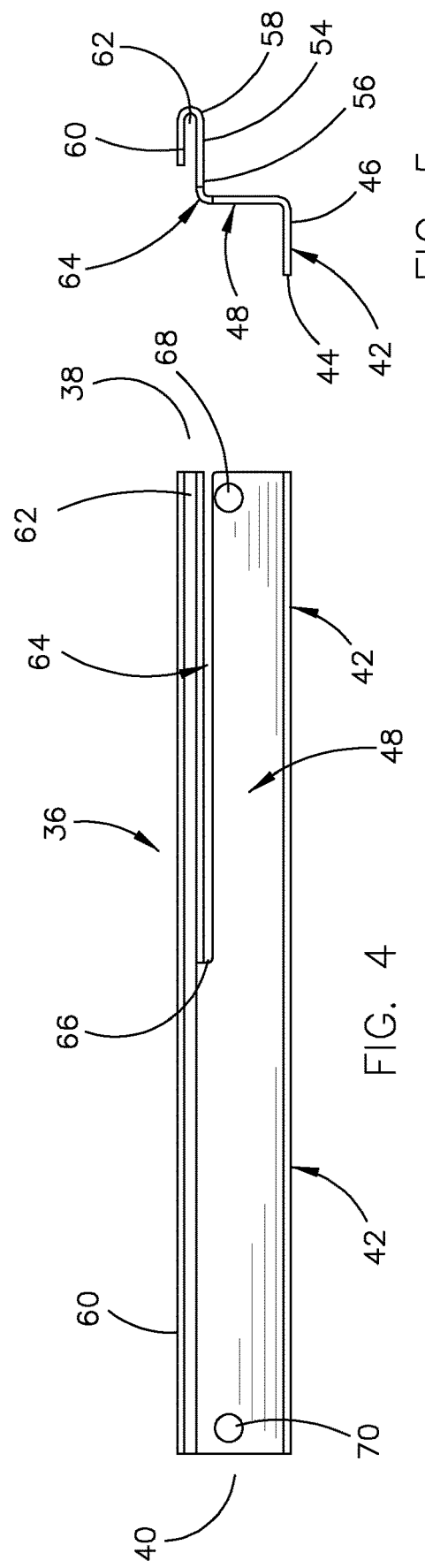
FIG. 3
FIG. 4
FIG. 5

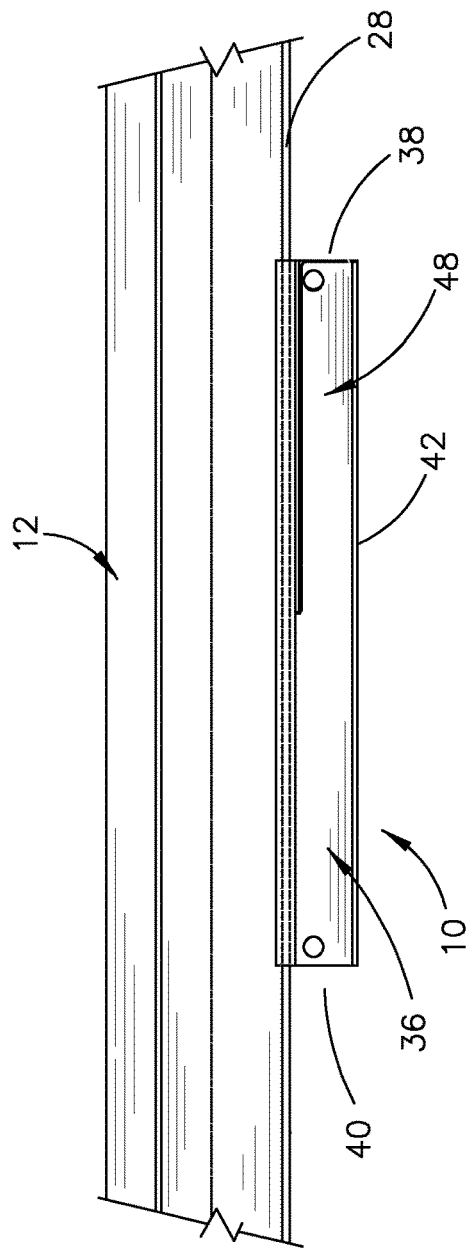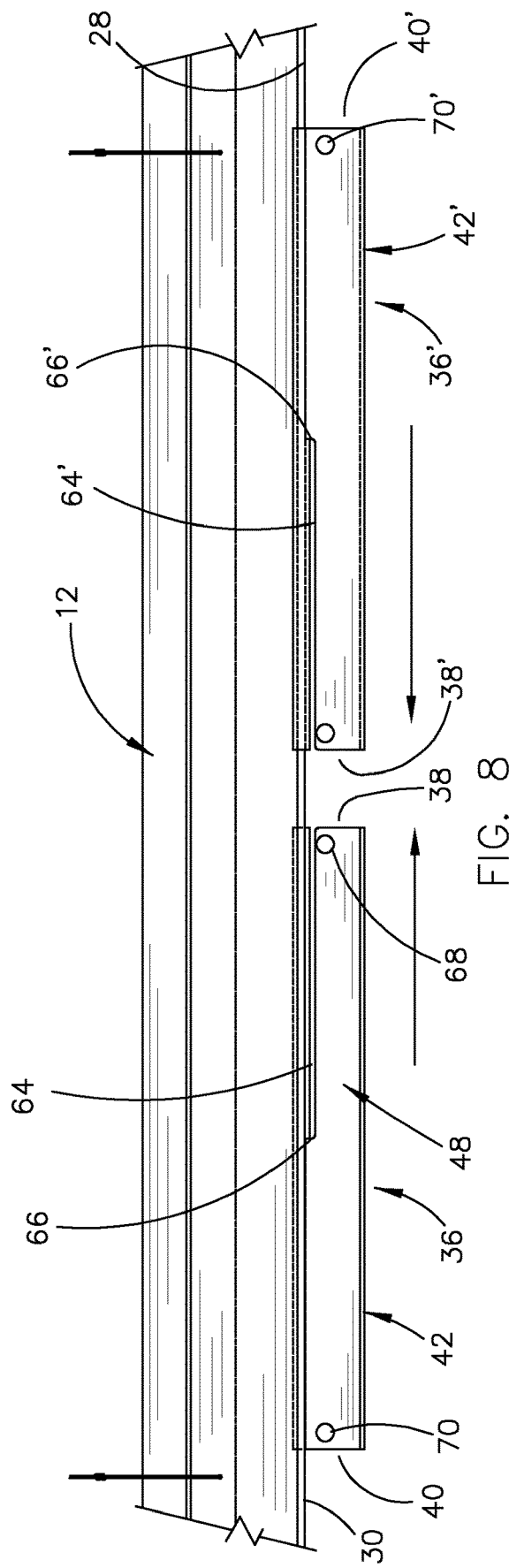

MOUNTING BRACKET ASSEMBLY FOR ATTACHMENT TO A SUSPENDED CEILING

BACKGROUND OF THE INVENTION

Field of the Invention

This invention relates to a mounting bracket assembly which may be attached to an inverted T-shaped rail or beam of a suspended ceiling. More particularly, this invention relates to a mounting bracket assembly which may be attached to the inverted T-shaped rail or beam of a suspended ceiling without any disassembly of the suspended ceiling system.

Description of the Related Art

Many types of mounting brackets for attachment to the inverted T-shaped rail or beam of a suspended ceiling system have been previously provided. The prior art mounting brackets enable objects or articles to be hung from the suspended ceiling or to be supported thereon. The prior art mounting brackets are difficult to attach to the suspended ceiling. The prior art brackets normally consist of at least two different bracket members which requires that the installer carry several of the two bracket members in inventory. Further, the prior art mounting brackets are rather expensive.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A mounting bracket assembly is disclosed for attachment to a suspended ceiling system. The mounting bracket assembly includes identical first and second mounting bracket members. Each of the first and second mounting bracket members includes an elongated and horizontally disposed flange having a first end, a second end, an inner end, an outer end, an upper side and a lower side. Each of the first and second mounting bracket members also includes an elongated and vertically disposed web having a first end, a second end, a lower end, an upper end, an inner side and an outer side. The lower end of the web is joined to the inner end of the flange thereof and extends upwardly therefrom. Each of the first and second mounting bracket members also includes an elongated and horizontally disposed upper wall having a first end, a second end, an inner end, an outer end, an upper side and a lower side with the inner end of the upper wall being joined to the upper end of the web so as to extend horizontally outwardly therefrom. Each of the first and second mounting bracket members also include an elongated and horizontally extending lip which extends upwardly and inwardly from the outer end of the upper wall to form an elongated groove at the outer end of the upper wall. Each of the first and second mounting bracket members also includes an elongated and horizontally disposed slot, having an outer end and an inner end, at the intersection of the web and the upper wall which extends thereinto from the first end of the web and the upper wall.

The first and second mounting brackets members are secured to the first and second flanges of the rail with the first and second mounting bracket members being secured together by means of the slots formed therein to maintain the first and second bracket members together and to maintain the first and second bracket members on the flanges of the rail.

It is therefore a principal object of the invention to provide an improved mounting bracket assembly for use with a suspended ceiling.

A further object of the invention is to provide a mounting bracket assembly of the type described which includes identical first and second mounting bracket members.

A further object of the invention is to provide a mounting bracket assembly which may be attached to a rail of a suspended ceiling without any disassembly of the suspended ceiling.

A further object of the invention is to provide a mounting bracket assembly which is easily attached to the flanges of a suspended ceiling rail.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3 is a top view of the mounting bracket of this invention;

FIG. 4 is a side view of the mounting bracket of this invention;

FIG. 5 is an end view of the mounting bracket of this invention;

FIG. 7 is a partial side elevational view of a rail of a suspended ceiling having a mounting bracket mounted thereon;

FIG. 8 is a view similar to FIG. 7 except that two of the identical mounting brackets are initially mounted on the rail of the suspended ceiling of FIG. 1;

DESCRIPTION OF THE PREFERRED EMBODIMENT

Figure 1:
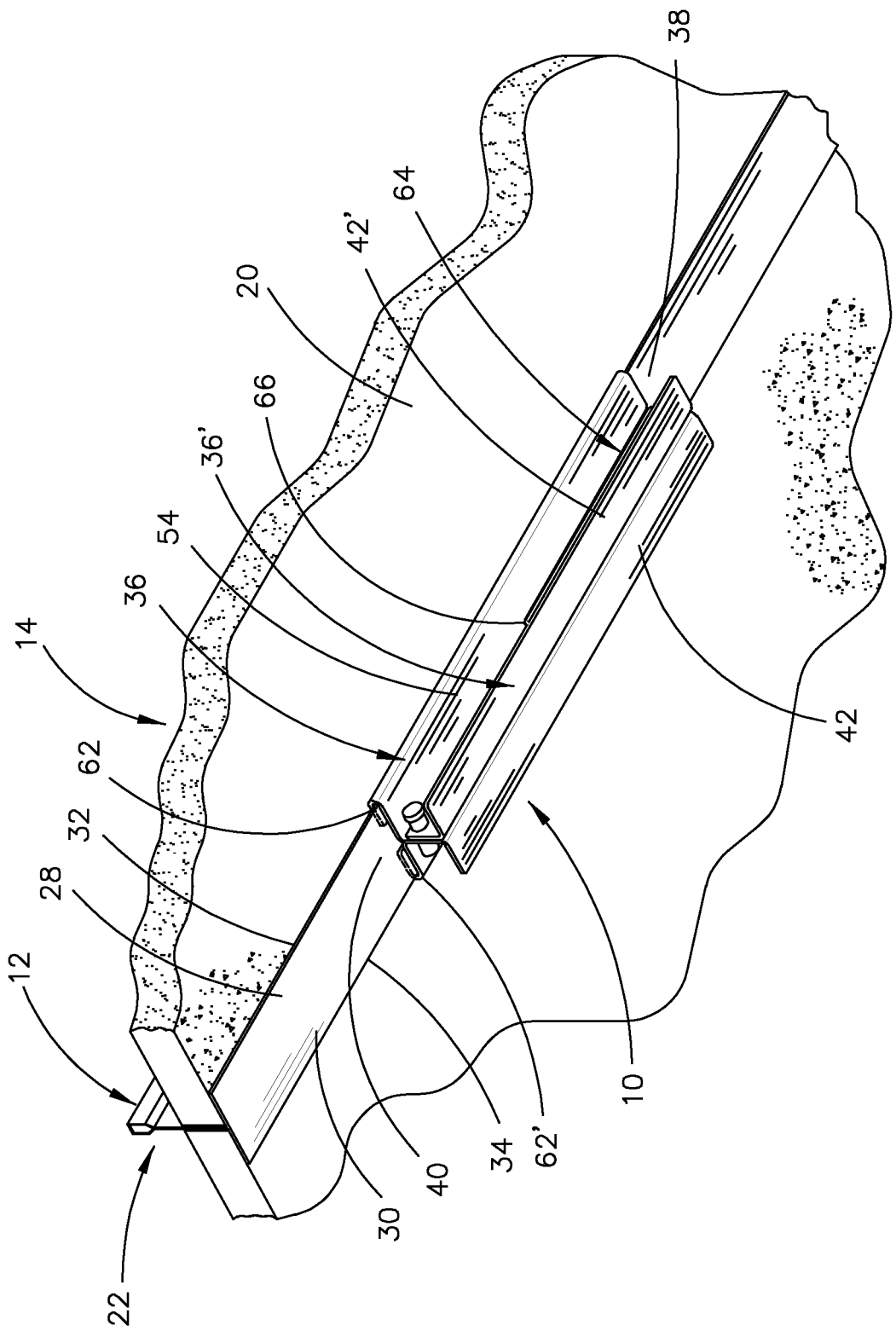
FIG. 1 is a partial perspective view of the mounting bracket assembly of this invention mounted on a rail of a suspended ceiling.
Figure 2:
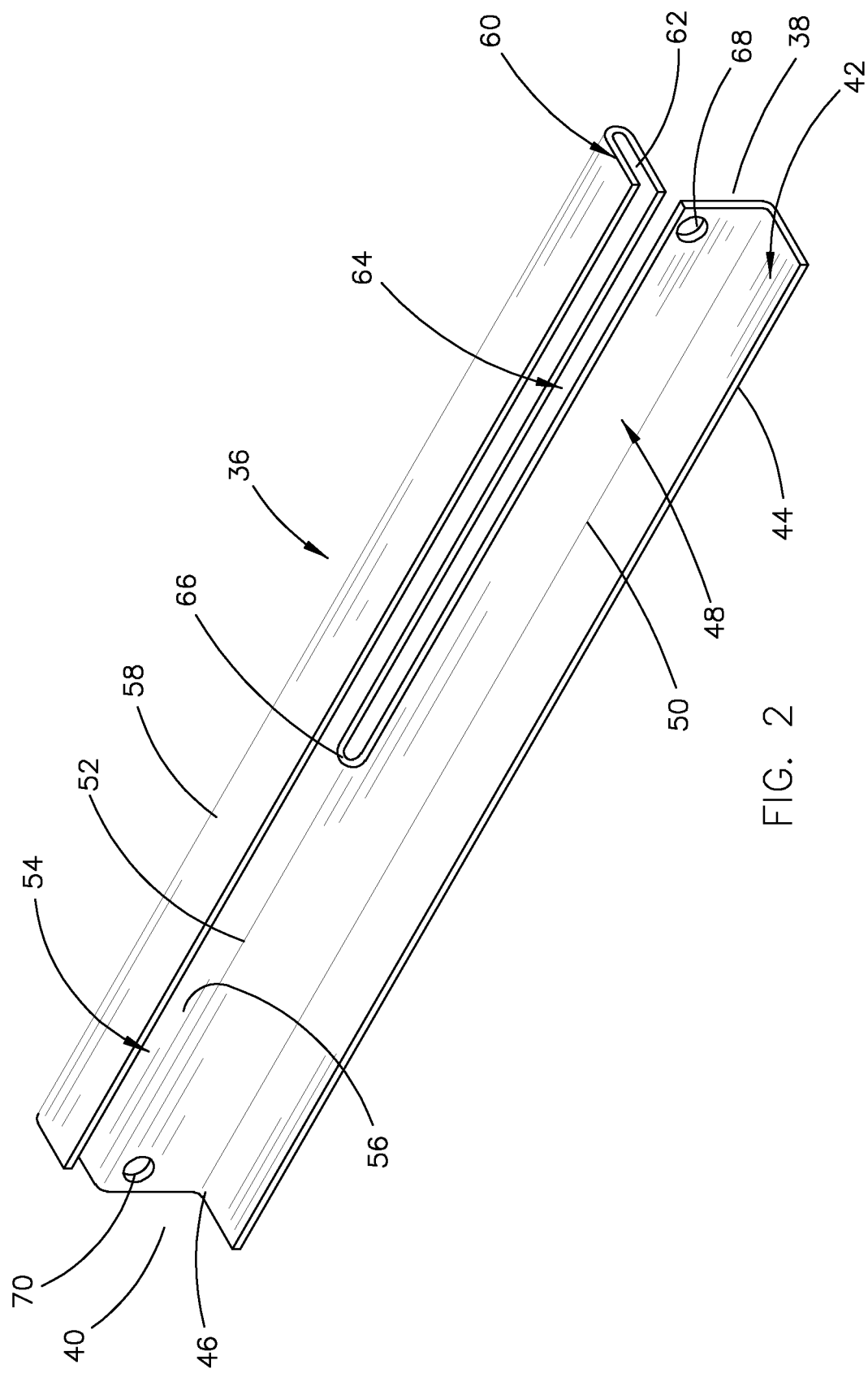
FIG. 2 is a perspective view of the mounting bracket of this invention.
Figure 6:
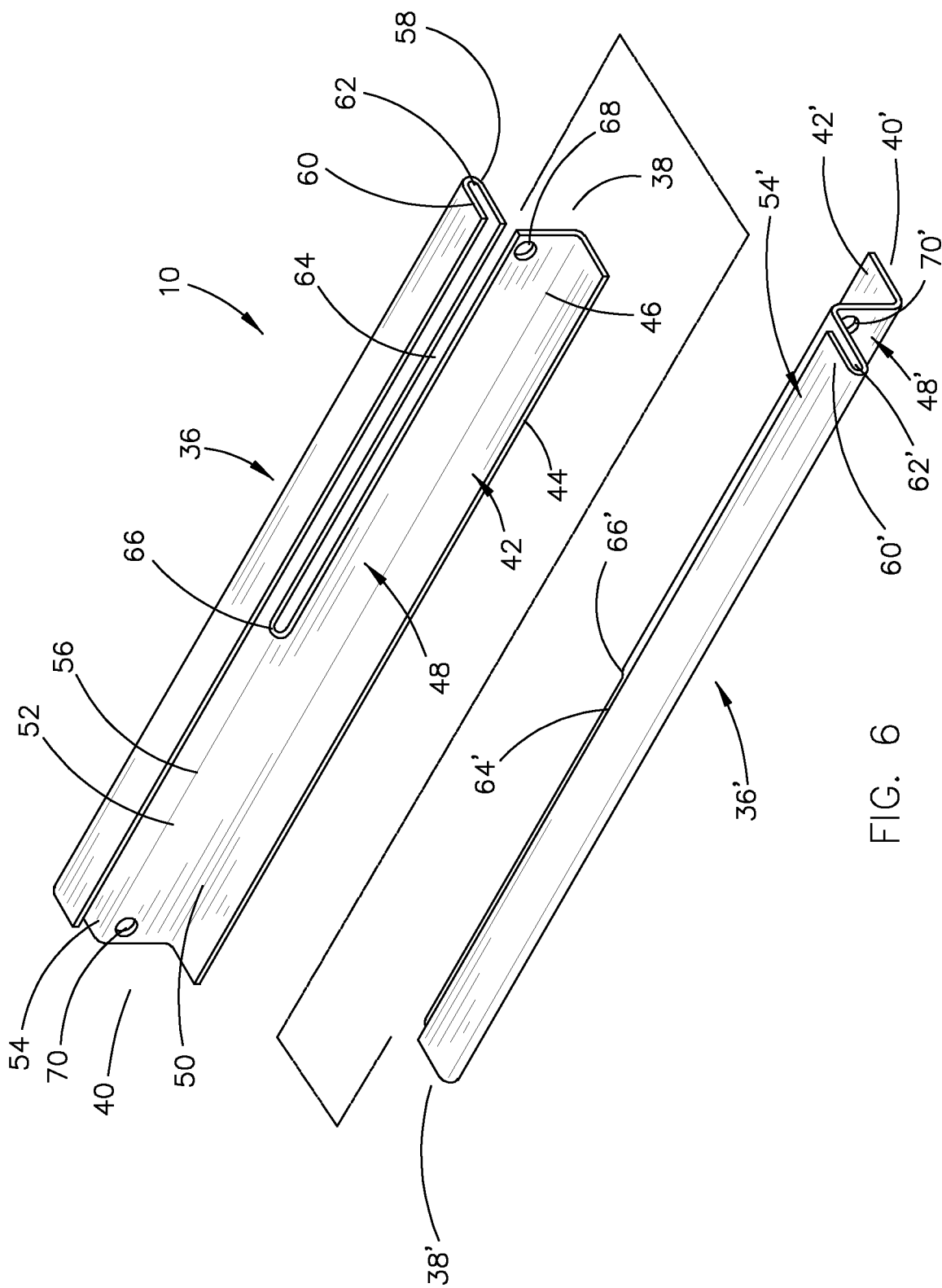
FIG. 6 is a perspective view of the mounting bracket assembly of this invention which is comprised of two identical mounting brackets.
Figure 9:
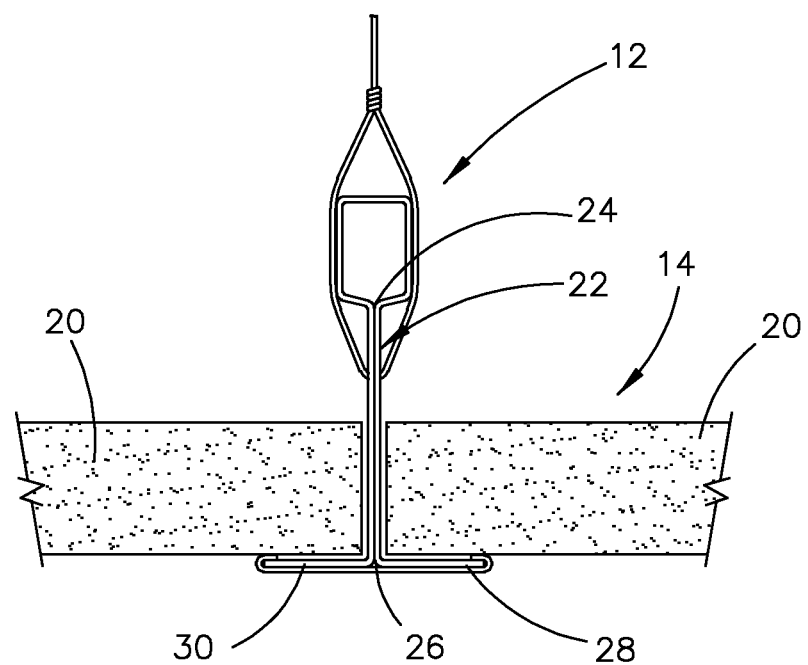
FIG. 9 is a partial sectional view of the rail of FIG. 1.
Figure 10:
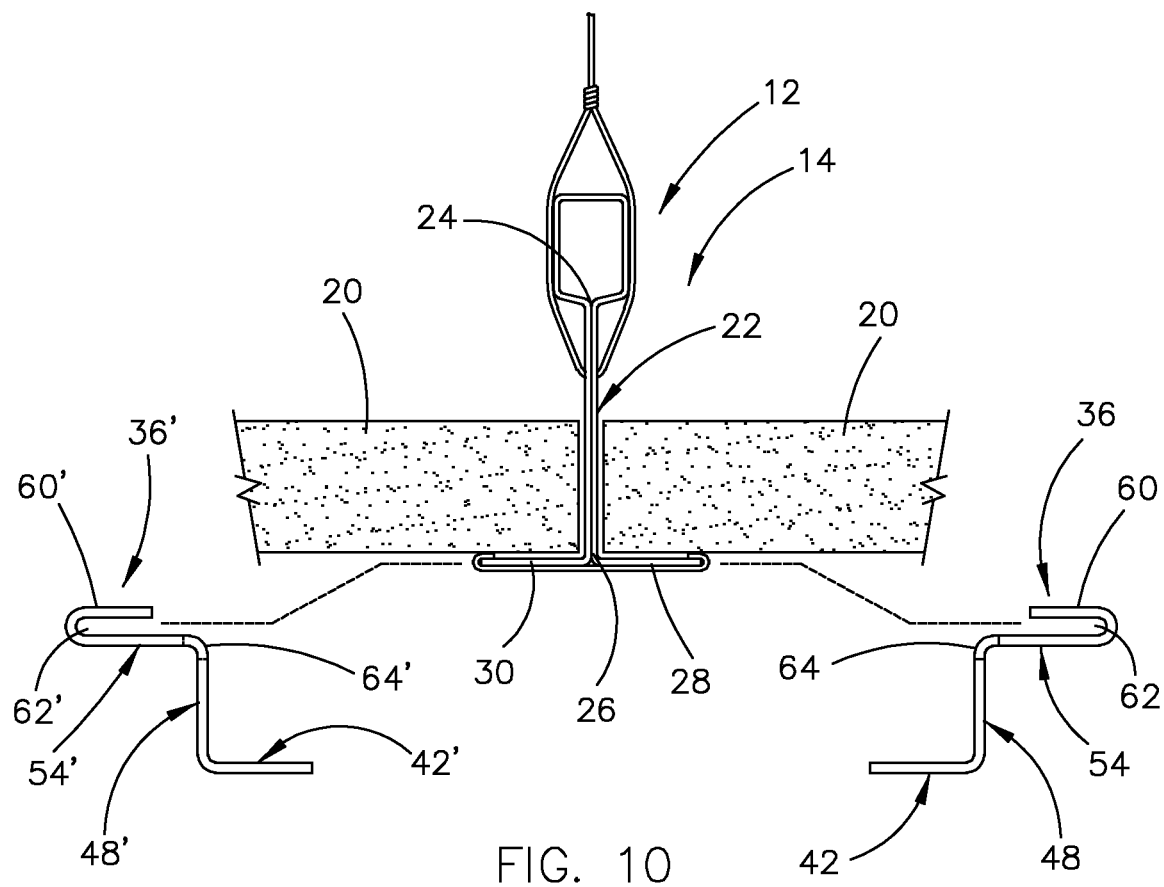
FIG. 10 is a view similar to FIG. 9 except that two of the mounting brackets are shown in an end view thereof.
Figure 11:
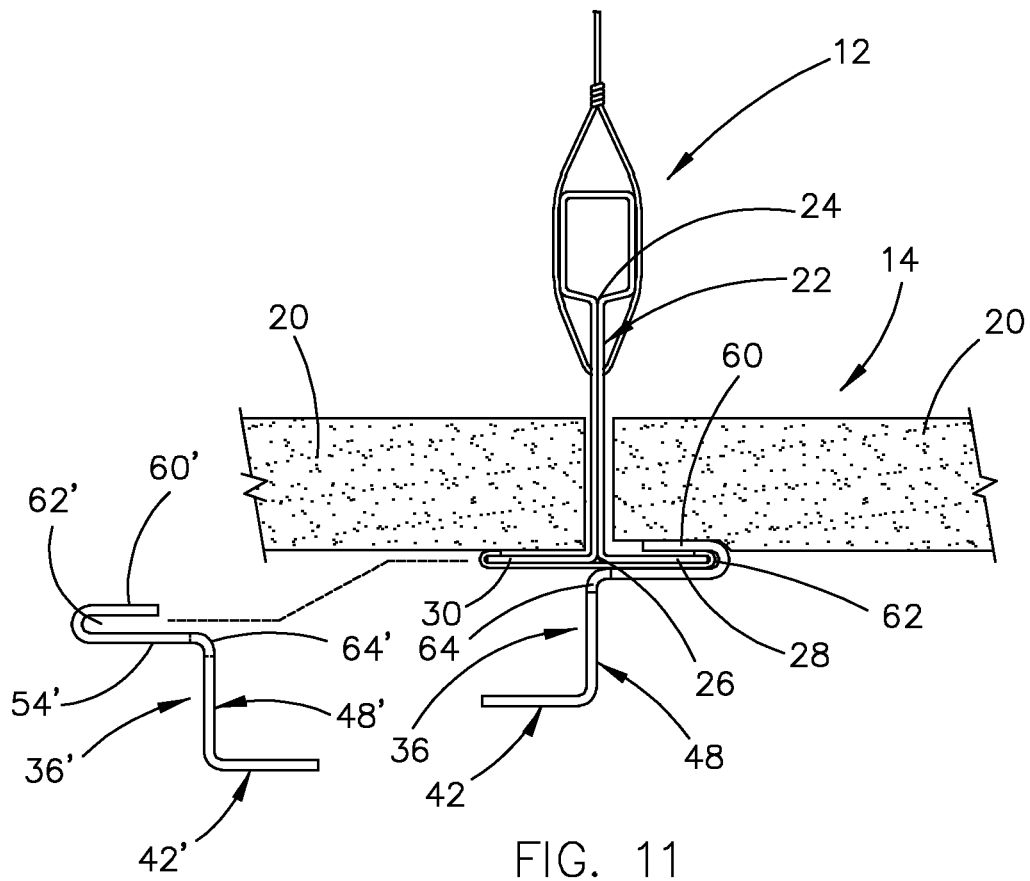
FIG. 11 is a view similar to FIG. 10 except that one of the mounting brackets is mounted on one of the flanges of the rail.
Figure 12:
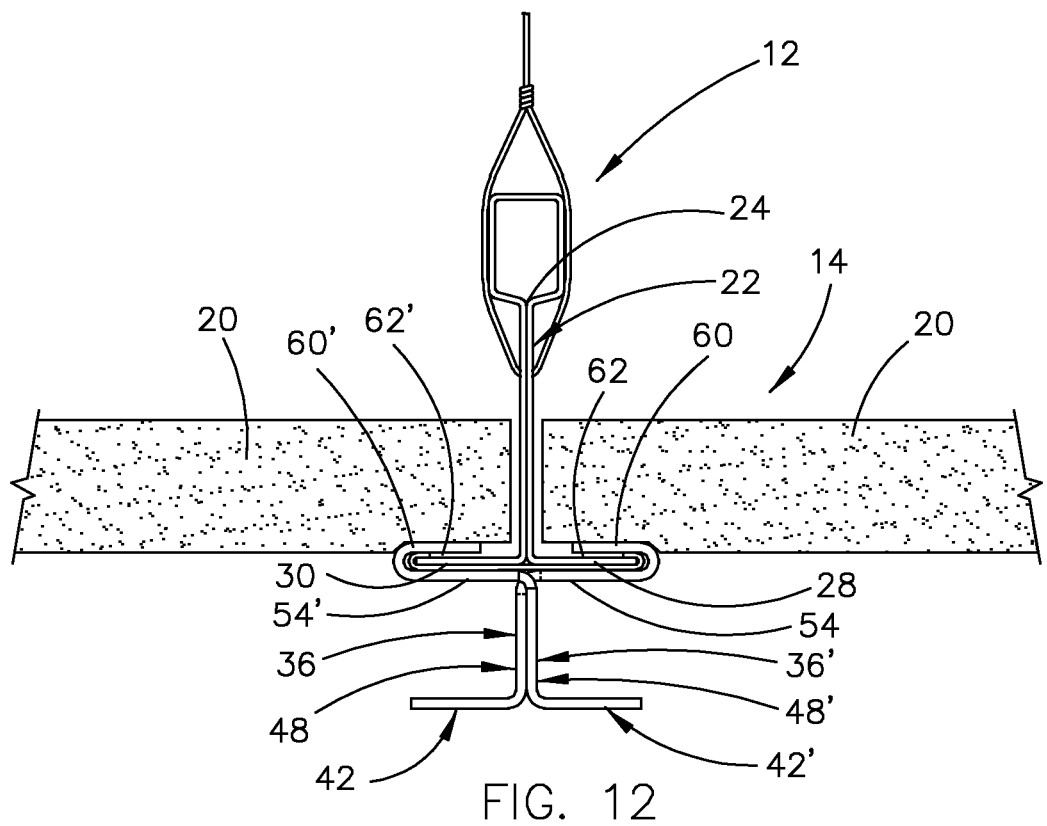
FIG. 12 is a view similar to FIG. 11 except that both of the mounting brackets are mounted on the rail.
Figure 13:
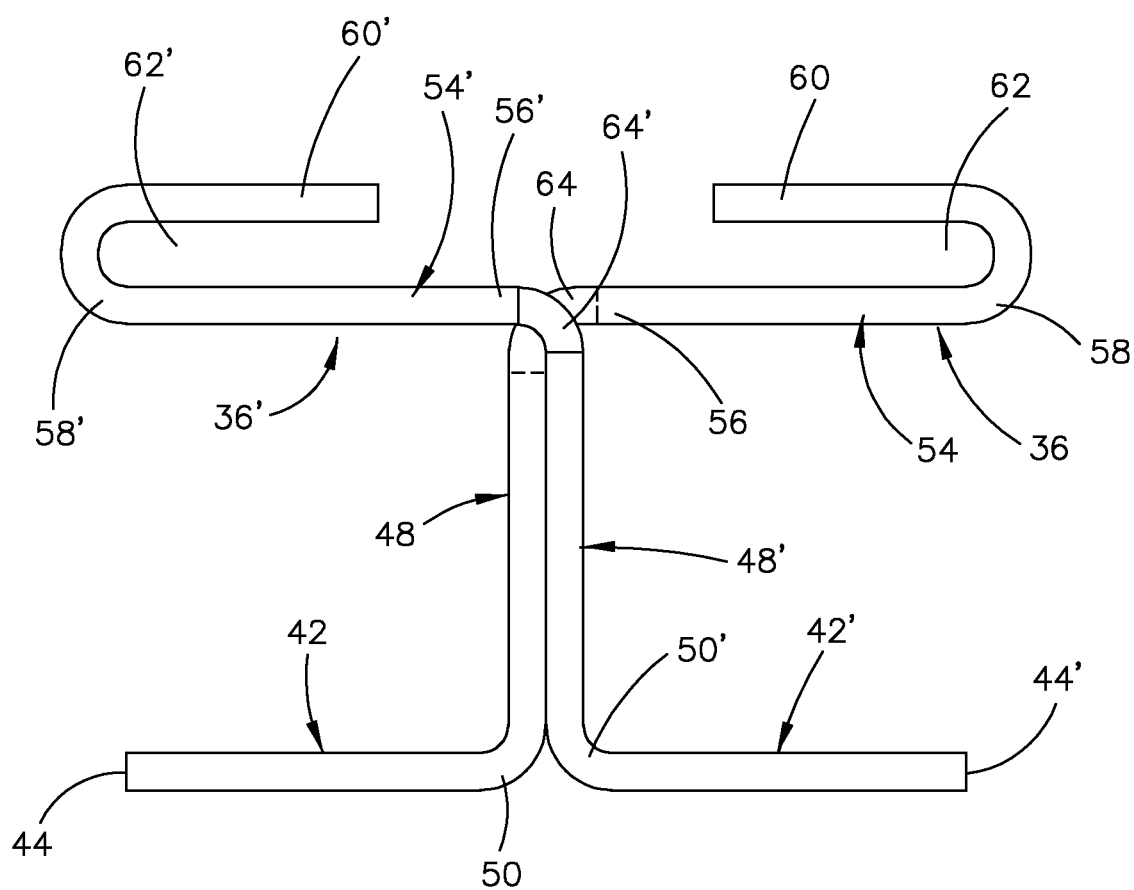
FIG. 13 is an end view illustrating the two mounting brackets are connected together.
Figure 14:
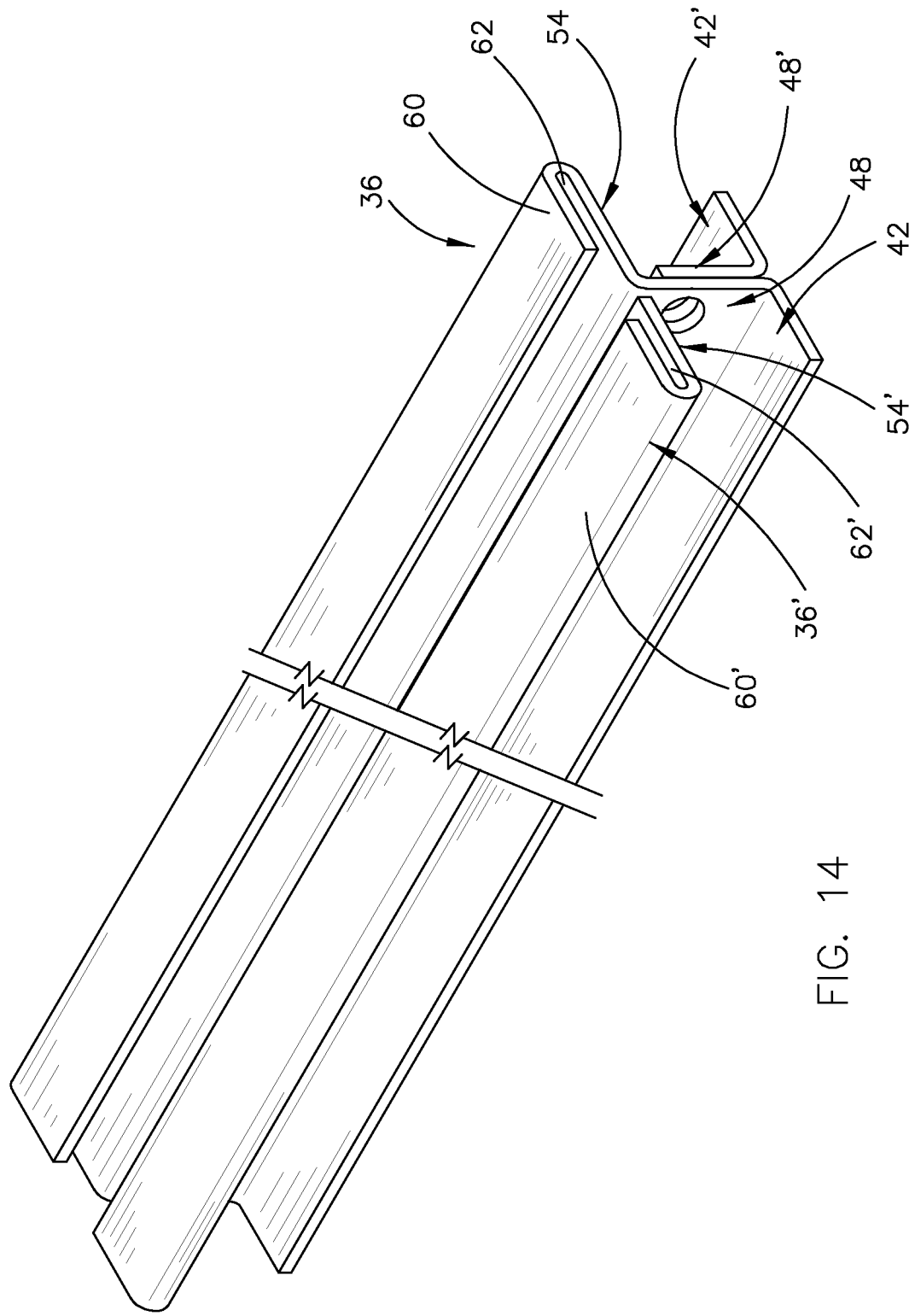
FIG. 14 is a partial perspective view illustrating the two mounting brackets connected together.
Figure 15:
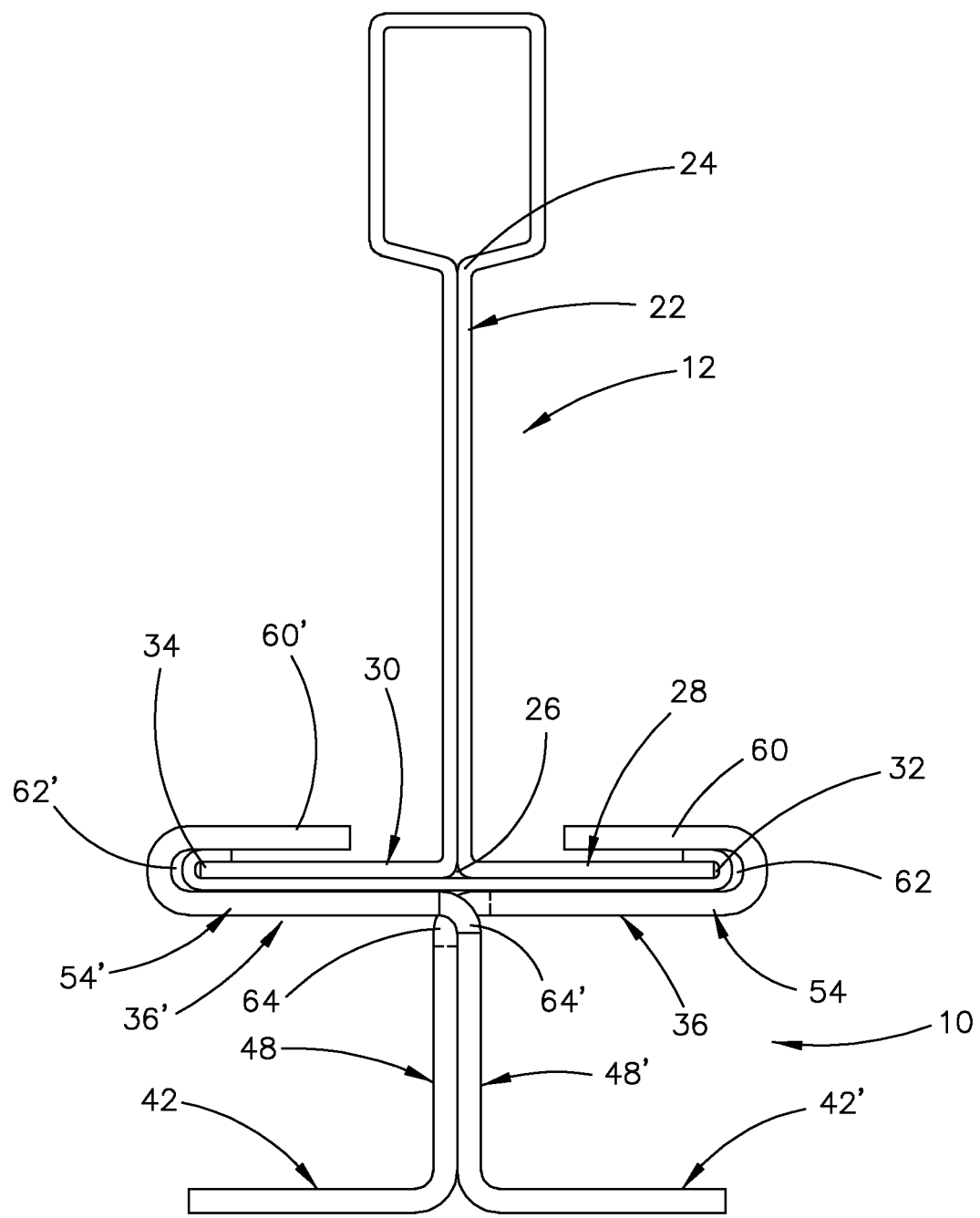
FIG. 15 is an end view wherein the two bracket members are shown as being mounted on the flanges of the rail.
Figure 16:
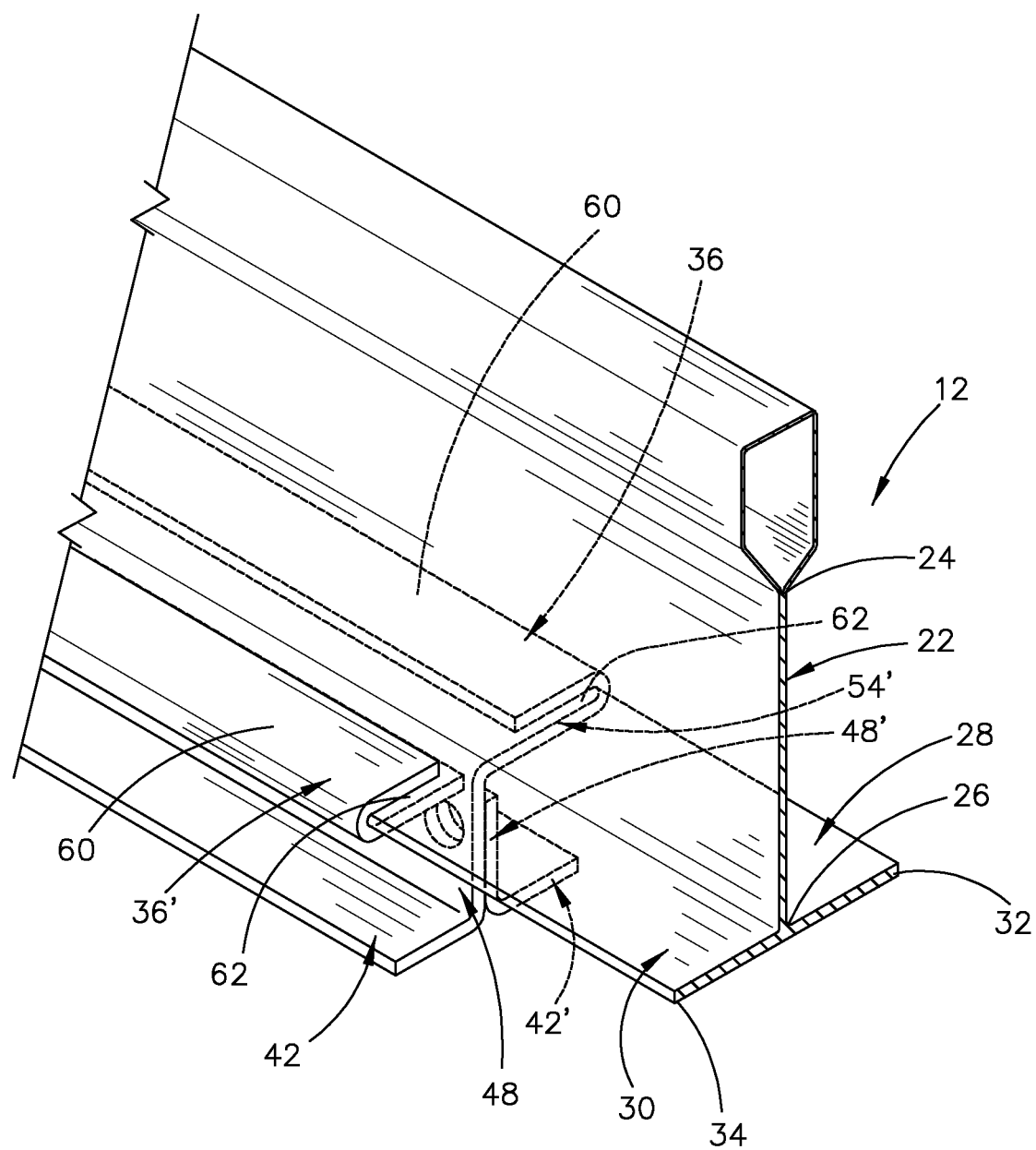
FIG. 16 is a partial perspective view illustrating the two bracket members mounted on the flanges of the rail which is shown in section.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The mounting bracket assembly of this invention is referred to by the reference number 10. Mounting bracket assembly 10 is designed to be attached to an inverted T-shaped rail, beam or "tee" 12 of a suspended ceiling system 14 including main or primary "tees" and cross "tees" having ceiling tiles 20 supported thereby. The inverted T-shaped rail 12 is horizontally disposed and elongated. Rail 12 includes a vertically disposed web 22 having an upper end 24 and a lower end 26. A flange 28 extends horizontally from the lower end 26 of web 22. A flange 30 extends horizontally from the lower end 26 of web 22. For purposes of description, flange 28 will be described as having an outer end 32 and flange 30 will be described as having an outer end 34.

The inverted T-shaped main and cross rails may be manufactured in one-piece or multiple pieces. In all cases, the main rails have a vertically disposed web 22 and flanges 28 and 30 extending from opposite sides of the lower end of the web 22.

Mounting bracket assembly 10 includes identical mounting bracket members 36 and 36'. Mounting bracket member 36 will be described in detail with "'" indicating identical structure in 36'. Mounting bracket member 36 is elongated and horizontally disposed. Mounting bracket member 36 may have various lengths and will be described as having a first end 38 and a second end 40. Mounting bracket member 36 includes a horizontally disposed flange 42 having an outer end 44 and an inner end 46. Mounting bracket member 36 also includes a vertically disposed web 48 which extends upwardly from the inner end 46 of flange 42, and which has a lower end 50 and an upper end 52. Mounting bracket member 36 also includes a horizontally disposed upper plate or wall 54 which extends outwardly from the upper end 52 of vertically disposed web 48 and which has an inner end 56 and an outer end 58. A lip 60 extends upwardly and inwardly from the outer end 58 of plate 54 to form a groove 62 which extends the length of mounting bracket member 36.

Preferably, mounting bracket member 36 is comprised of a metal material such as aluminum. Mounting bracket member 36 may also be comprised of a durable plastic material.

Mounting bracket member 36 has an elongated slot 64 formed therein which extends inwardly from end 38 of mounting bracket member 36 at the intersection of the upper end of vertically disposed web 48 and the inner end 56 of plate 54. Slot 64 has an inner end 66 which is positioned midway between ends 38 and 40 of mounting bracket member 36. The vertically disposed web 48 of mounting bracket member 36 may have an opening 68 formed therein at the end 38 thereof and an opening 70 formed at the end 40 thereof.

As stated hereinabove, mounting bracket member 36' is identical to mounting bracket member 36. Mounting bracket member 36' has a first end 38' and a second end 40'. Mounting bracket member 36' also includes a horizontally disposed flange 42' having an outer end 44' and an inner end 46'. Mounting bracket member 36' also includes a vertically disposed web 48' having a lower end 50' and an upper end 52'. Mounting bracket member 36' also includes a horizontally disposed upper plate or wall 54' which extends outwardly from the upper end 52' of vertically disposed web 48' and which has an inner end 56' and an outer end 58'. A lip 60' extends upwardly and inwardly from the outer end 58' of plate 54' to form a groove 62' which extends the length of mounting bracket member 36'.

Mounting bracket member 36' has an elongated slot 64' formed therein which extends inwardly from end 38' of mounting bracket member 36' at the intersection of the upper end of vertically disposed web 48' and the inner end 56' of plate 54'. Slot 64' has an inner end 66' which is positioned midway between ends 38' and 40' of mounting bracket member 36'. The vertically disposed web 48' of mounting bracket 36' may have an opening 68' formed therein at the end 40' and an opening 70' formed at the end 38' thereof.

The mounting bracket assembly 10 is attached to a rail 12 of a suspended ceiling system 14 as will now be described. The mounting bracket member 36 is positioned adjacent one side of the rail 12 so that the groove 62 of mounting bracket member 36 is parallel to and adjacent the outer end 32 of flange 28 of rail 12. The mounting bracket member 36 is then moved towards rail 12 so that the outer end 32 of flange 28 is received in the groove 62 of mounting bracket member 36. In that position, the slot 64 of mounting bracket member 36 will be extending into mounting bracket member 36 from the right side of the mounting bracket member 36 as viewed in FIG. 1. The mounting bracket member 36' is then positioned at the other side of the rail 12 so that the groove 62' of mounting bracket member 36' is positioned parallel to and adjacent the outer end 34 of flange 30 of rail 12 and so that the mounting bracket member 36' is spaced longitudinally to the right of mounting bracket 36 (FIG. 8). Mounting bracket member 36' is then moved towards rail 12 so that the outer end 34 of flange 30 is received in the groove 62' of mounting bracket member 36'. In that position, the slot 64' of mounting bracket member 36' will be extending into mounting bracket member 36' from the left side of mounting bracket 36' (FIG. 8). In that position, the inner ends 66 and 66' of the slots 64 and 64' respectively will be longitudinally offset from one another. Mounting bracket members 36 and 36' are then moved towards one another wherein the slots 64 and 64' communicate with one another to permit the web 48, below the slot 64 in mounting bracket member 36, to slidably engage the web 48', below the slot 64' in mounting bracket 36', until the inner ends 66 and 66' of slots 64 and 64' respectively prevent further inward movement of the mounting bracket members 36 and 36' and thereby attaching the mounting bracket members 36 and 36' together so as to be able to support articles or objects therefrom. The engagement of the mounting bracket members 36 and 36' ensures that the mounting bracket assembly 10 is securely attached to the rail 12.

The mounting bracket assembly 10 of this invention is configured so as to be mounted on a rail 12 of a suspended ceiling system 14 without any disassembly of the ceiling system 14. Further, no tools are required to mount the assembly 10 on the rail 12. Additionally, the assembly 10 may be mounted on the rail 12 without any additional parts or items. The fact that the mounting bracket assembly 10 is comprised of identical first and second mounting bracket members 36 and 36' enables the installer to only have mounting bracket members 36 in inventory. Finally, the invention provides a mounting bracket assembly 10 which is securely mounted on the rail 12 so as to be able to support articles or objects.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A mounting bracket assembly, comprising:

identical first and second mounting bracket members;

each of said first and second mounting bracket members comprising:

(a) an elongated and horizontally disposed flange having a first end, a second end, an inner end, an outer end, an upper side and a lower side;

(b) an elongated and vertically disposed web having a first end, a second end, a lower end, an upper end, an inner side and an outer side;

(c) said lower end of said web being joined to said inner end of said flange and extending upwardly therefrom;

(d) an elongated and horizontally disposed upper wall having a first end, a second end, an inner end, an outer end, an upper side and a lower side;

(e) said inner end of said upper wall being joined to said upper end of said web and extending horizontally outwardly and in an opposite direction from the outer end of said flange;

(f) an elongated and horizontally extending lip extending upwardly and inwardly from said outer end of said upper wall thereby forming an elongated groove at said outer end of said upper wall; and (g) an elongated and horizontally disposed slot, having an outer end and an inner end, the elongated and horizontally disposed slot at the intersection of said web and said upper wall extending thereinto from said first ends of said web and said upper wall.

2. The mounting bracket assembly of claim 1 wherein said inner ends of said slots are positioned midway between said first and second ends of said web and said upper wall.

3. The mounting bracket assembly of claim 1, wherein said web includes an opening at the first end of said web and another opening at the second end of said web.

4. The mounting bracket assembly of claim 1, wherein the elongated groove extends an entire length of said first mounting bracket member or said second mounting bracket member.

\* \* \* \* \*